United States Patent
Oberle

(10) Patent No.: US 7,916,028 B2
(45) Date of Patent: Mar. 29, 2011

(54) RFID INVENTORY MONITOR

(75) Inventor: Robert R. Oberle, Macungie, PA (US)

(73) Assignee: RCD Technology Inc., Quakertown, PA (US)

( * ) Notice: Subject to any disclaimer, the term of this patent is extended or adjusted under 35 U.S.C. 154(b) by 375 days.

(21) Appl. No.: 12/131,757

(22) Filed: Jun. 2, 2008

(65) Prior Publication Data

US 2009/0128333 A1    May 21, 2009

Related U.S. Application Data

(60) Provisional application No. 60/988,659, filed on Nov. 16, 2007.

(51) Int. Cl.
    *G08B 13/14*      (2006.01)
    *G06Q 10/00*      (2006.01)
    *G06F 19/00*      (2006.01)

(52) U.S. Cl. .............. 340/572.1; 340/505; 340/5.92; 235/385; 705/28

(58) Field of Classification Search .......... 340/572.1
See application file for complete search history.

(56) References Cited

U.S. PATENT DOCUMENTS

| 6,195,006 | B1 * | 2/2001 | Bowers et al. ............ 340/572.1 |
| 7,540,419 | B2 * | 6/2009 | Amitay et al. ............... 235/385 |
| 2004/0111335 | A1 * | 6/2004 | Black et al. .................... 705/28 |

* cited by examiner

*Primary Examiner* — Donnie L Crosland
(74) *Attorney, Agent, or Firm* — Fliesler Meyer LLP

(57) ABSTRACT

Moving a mobile RFID reader with an area in a systemic manner to do non-inventory tasks, while doing the non-inventory tasks, integrating RFID tags associated with inventory, and updating a database with the inventory information obtained from the RFID tags.

16 Claims, 3 Drawing Sheets

RFID INVENTORY MONITOR

CLAIM OF PRIORITY

This application claims priority to U.S. Provisional Application No. 60/988,659 entitled "RFID BASED KEYBOARD" filed Nov. 16, 2007, which is incorporated herein by reference.

BACKGROUND OF THE INVENTION

The use of Radio Frequency Identification (RFID) tags for inventory control is well known. These tags are broadly defined as radio frequency transponders allow tagged inventory items to uniquely self identify themselves to a suitably configured network of RFID readers. These readers interface with a computer network to monitor the movement and/or status of inventory or work-in-process.

Systems tend to fall into two categories, fixed point monitoring and scanning. In the fixed point modality tagged items move passed a fixed reader that localizes the item in time and position. This modality is well suited to monitoring movement of items into and out of a specific area as well as movement along a linear process such as a packaging or assembly line. In a scanning modality, a mobile scanner moves in an area reading and logging, all the RFID tags that are in range of the reader as it moves through the inventory area. This modality is better suited for monitoring static inventory such as materials in a warehouse or books in an archive, in further discussion, it should be understood that warehouse may be taken to mean for holding static inventory.

In many warehouse applications using a scanning or roaming reader, it is also advantageous to know not only that an item is present in the warehouse but also where the item is located, i.e. on which shelf our in which aisle in a storeroom. In order to localize items in a space, the roaming reader may follow a preprogrammed track or may periodically update its location through a number of methods. The mobile reader may have an integrated Real Time Location System (RTLS), the reader may have its location manually updated by an operator, or it may pass certain reference points in its progress along a preplanned route through the warehouse. In general these approaches are adequate for determining the inventory state of a warehouse; however they have the disadvantage that the reader must follow a pre-programmed (deterministic) path or route through the warehouse and they require an initial sweep to determine the initial locations of items in the warehouse. This may be time consuming and may not provide the degree of real time location of items that is required, especially in an active warehouse where items may be moved from storage location to storage location or there may be several stocking locations for similar or associated items with the same warehouse. Further the ease of monitoring, storing and moving data associated with a large operation may be difficult.

SUMMARY

Embodiments of the present invention concern the use of a RFID reader to do inventory in a non-systemic manner. An RFID reader can be moved with a user as the user does non-inventory tasks and the RFID reader can get inventory data in the background.

DETAILED DESCRIPTION

Figure 1:
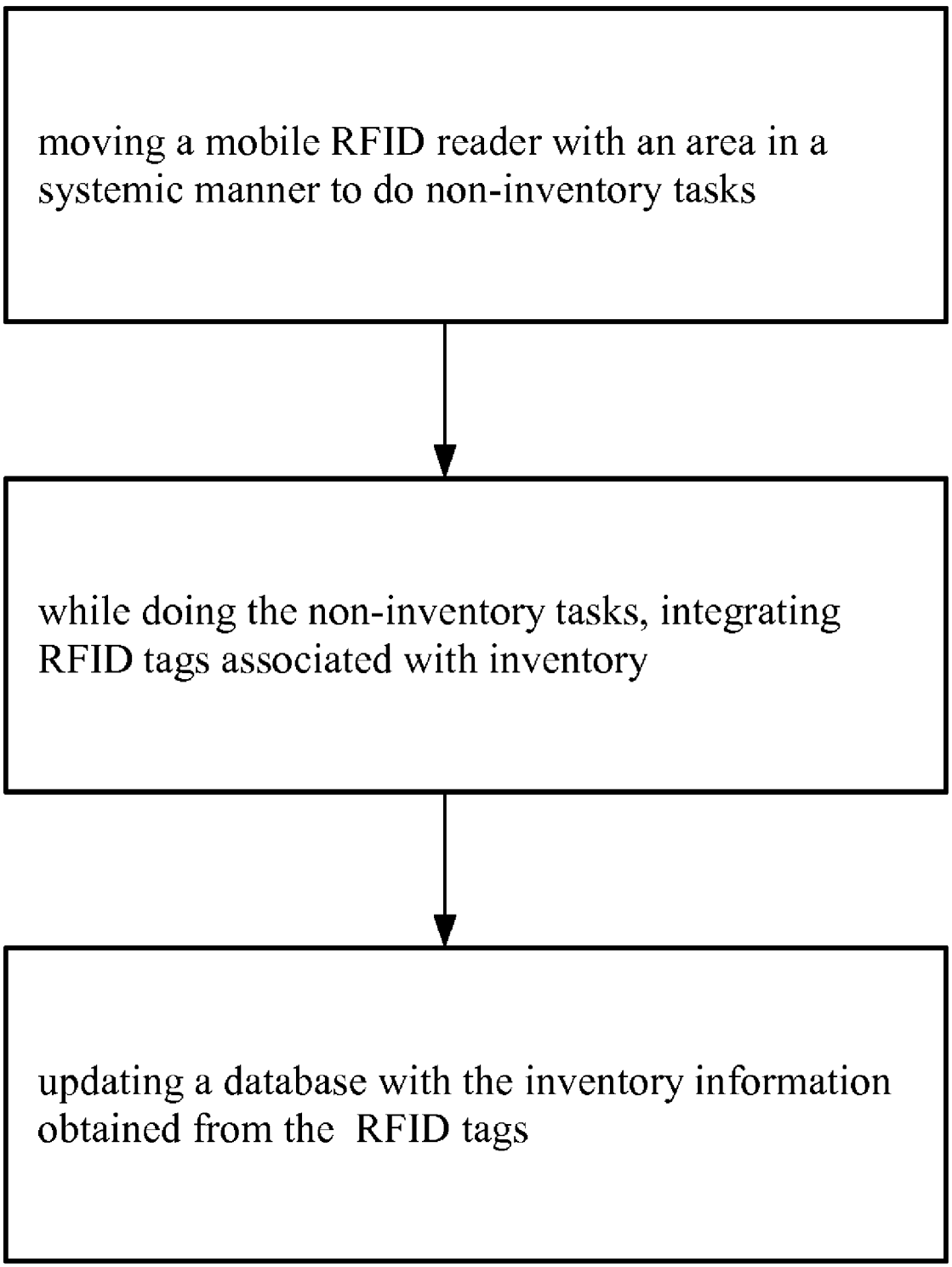
FIG. 1 is a flow chart of a method of the present invention.

FIG. 1 shows a method of one embodiment of the present invention. In step 102, an RFID reader is moved within an area, such as a warehouse, to do non-inventory tasks. For example, the RFID reader can be on a mobile unit or attached to a worker as they go get a box to bring to another location.

In step 104, while the user does non-inventory tasks, RFID tags are interrogated. The RFID tags can be associated with inventory, such as the boxes of product.

In step 106, the inventory information obtained from the RFID tags is used update a database.

Additional RFID tags can be associated with positional markers.

Rules can be used to determine when to update the database. The rules can include a rule to determine when to indicate to the database that a piece of inventory is no longer at a certain location. The range of the RFID reader can be used to determine the rules. A learning mode can be used to determine the rules.

Figure 2:
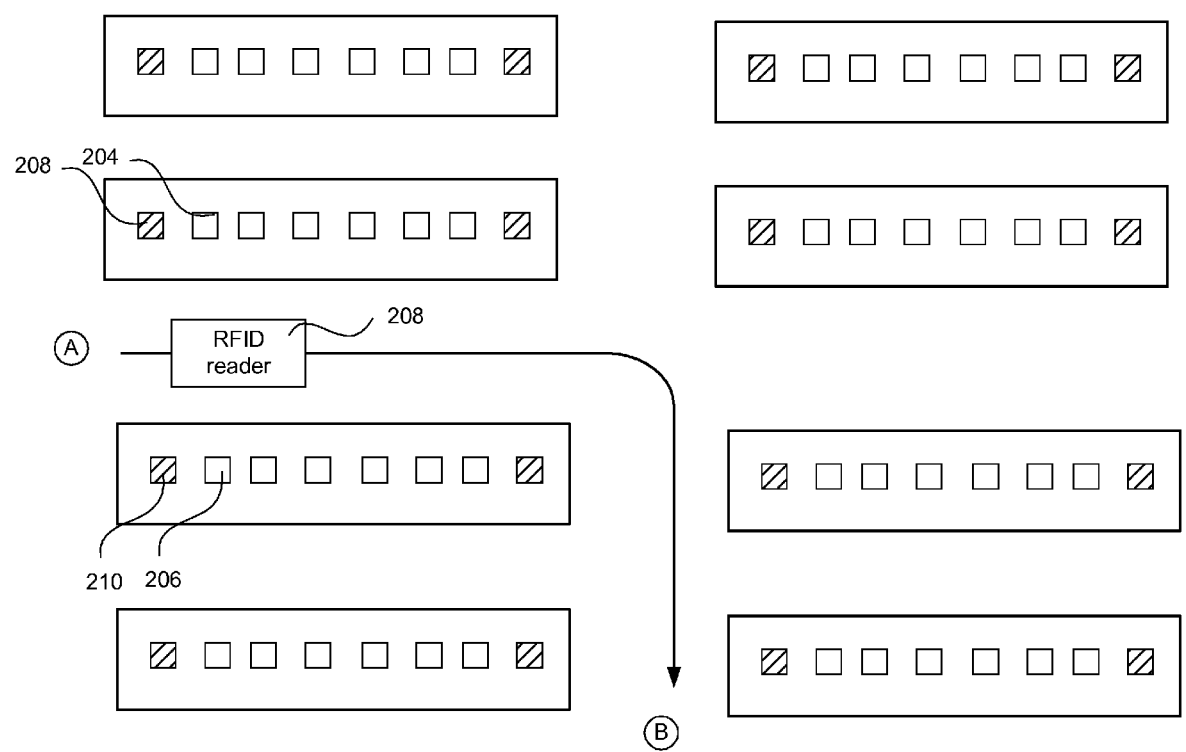
FIG. 2 is a diagram illustrating the operation of embodiment of the present invention.

FIG. 2 shows an example of the operation of the system of one embodiment. An RFID reader 202 moves from point A to point B to do a non-inventory task. The RFID reader 202 can integrate RFID tags 204, 206 associated with inventory as well as RFID tags 208, 210 at positional markers.

Figure 3:
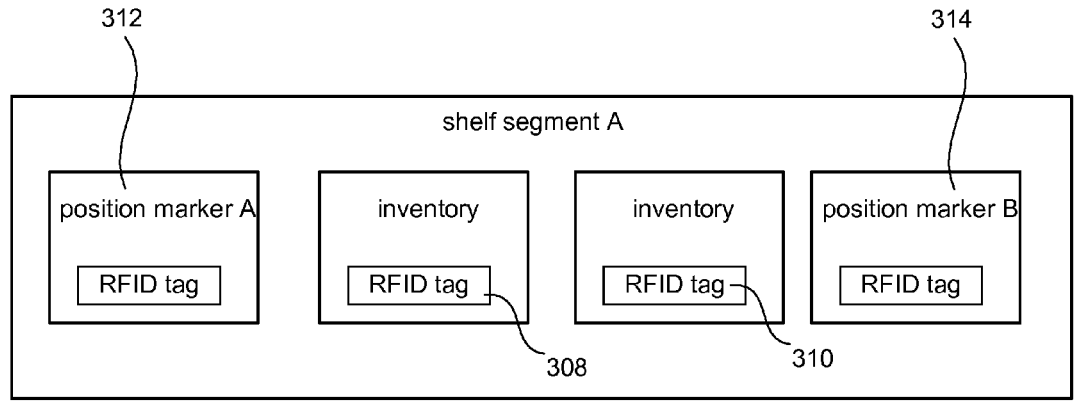
FIG. 3 is a diagram that illustrates a method of one embodiment of the present invention.
Figure 3:
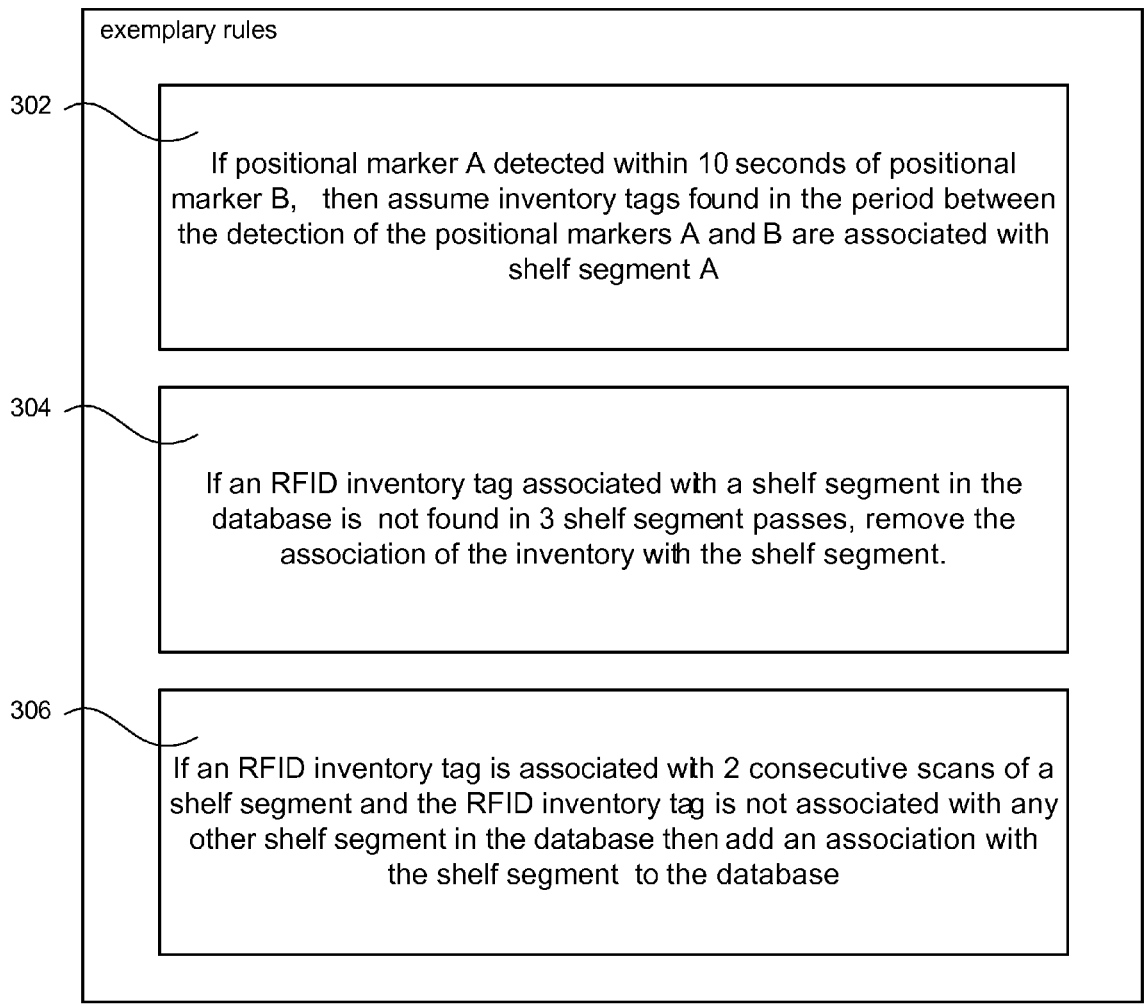

FIG. 3 shows three exemplary RFID rules of one embodiment. Rule 302 indicates how to associate an RFID inventory tag 308 and 310 with a scan of a shelf segment defined by positional markers A and B (312 and 314).

Rule 304 indicates how many scans of a shelf segment to do before removing the association of a person of inventory from the shelf segment in the database.

Rule 306 indicates where to add an association of an RFID tag with a shelf segment.

These rules are merely exemplary; many other types of rules can be used.

FIG. 4 shows an exemplary system with a mobile RFID reader 402. Software 404 on computer 406 receives information from the mobile RFID reader. The software 404 receives RFID tags information associated with inventory and updates a database 408 with inventory information.

The software 404 can include a rules engine 410 to implement rules 412 against the RFID data.

Tagged items can be monitored in an inventory warehouse through a random association methodology. In this method, known reference points can be placed within the material storage area and they are used to guide a manual or automated picking operation. These reference points can be used to locate the readers integrated into the item picking equipment. In this case the picking equipment may be a forklift truck, robotic retrieval system or a human operator with an RED enable reader. As the picker move through the warehouse it can monitor the environment of tagged items in its surroundings, both tagged inventory and tags attached to reference points. Over time, the picker will sample the entire warehouse and establish associative data of objects and locations. This coupled with the knowledge of the reader capabilities, range, data acceptance can be used to firmly establish the location of the objects in the warehouse. This approach is also well suited to a "space available" approach in which articles are stored in the first available open area.

An inventory system can use passive RFID tags in which the location of tagged articles is determined by passive monitoring of the tagged articles.

In one embodiment, the location of objects in a warehouse can be determined through use of passive tags on stored objects, reference tags dispersed at known points in the warehouse and an associative database.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A method comprising:
   moving a mobile Radio Frequency Identification (RFID) reader within an area to do non-inventory tasks, the RFID reader being associated with a person or mobile unit while the person or mobile unit does the non-inventory task;
   while doing the non-inventory tasks, interrogating RFID tags associated with inventory and interrogating RFID tags associated with positional markers; and
   updating a database with the inventory information obtained from the RFID tags;
   wherein the updating of the database includes determining what inventory is currently associated with a detected positional marker and updating the database when multiple passes detect the positional marker, but do not detect certain inventory associated with that positional marker.

2. The method of claim 1, wherein the mobile RFID reader is attached to a mobile unit.

3. The method of claim 1, wherein the mobile RFID reader is carried by a person.

4. The method of claim 1, wherein the area is a warehouse.

5. The method of claim 1, wherein rules are used to determine when to update the database.

6. The method of claim 5, wherein the rules include a rule to indicate the number of missed passes before indicating to the database that the certain inventory is no longer at a certain position.

7. The method of claim 5, wherein the capacities of the reader such as range is used to determine the rules.

8. The method of claim 5, wherein a teaching mode is used to determine the rules.

9. A system comprising:
   a mobile Radio Frequency Identification (RFID) reader;
   a unit to receive the information from the RFID reader and, while the mobile RFID reader is moved to do non-inventory tasks, the RFID reader being associated with a person or mobile unit while the person or mobile unit does the non-inventory task receiving RFID tag information associated with inventory and receiving RFID tag information associated with positional markers, and updating a database with inventory information; and
   wherein the updating of the database includes determining what inventory is currently associated with a detected positional marker and updating the database when multiple passes detect the positional marker, but do not detect certain inventory associated with that positional marker.

10. The method of claim 9, wherein the mobile RFID reader is attached to a mobile unit.

11. The method of claim 9, wherein the mobile RFID reader is carried by a person.

12. The method of claim 9, wherein the area is a warehouse.

13. The method of claim 9, wherein rules are used to determine when to update the database.

14. The method of claim 13, wherein the rules include a rule to indicate the number of multiple missed passes before indicating to the database that the certain inventory is no longer at a certain position.

15. The method of claim 13, wherein the capacities of the reader such as range is used to determine the rules.

16. The method of claim 13, wherein a teaching mode is used to determine the rules.

* * * * *